United States Patent [19]

Enami

[11] Patent Number: 4,471,079

[45] Date of Patent: Sep. 11, 1984

[54] AQUEOUS INK

[75] Inventor: Shigekazu Enami, Hiratsuka, Japan

[73] Assignee: Pilot Man-Nen Hitsu Kabushiki Kaisha, Tokyo, Japan

[21] Appl. No.: 467,426

[22] Filed: Feb. 17, 1983

[30] Foreign Application Priority Data

Mar. 4, 1982 [JP] Japan ............................. 57-033102
Jan. 31, 1983 [JP] Japan ............................. 58-14400

[51] Int. Cl.$^3$ ............................................. C08F 8/30
[52] U.S. Cl. ................................... 523/161; 524/555; 525/328.2; 525/328.3; 525/328.4
[58] Field of Search ............... 523/160, 161; 524/555; 525/328.2, 328.3, 328.4

[56] References Cited

U.S. PATENT DOCUMENTS 4,061,844 12/1977 Itoh ..................................... 524/555
4,178,422 12/1979 Otteson ............................. 525/328.2
4,250,068 2/1981 Ali-Zaidi ............................. 523/160
4,382,800 5/1983 Wang ................................. 525/328.2

Primary Examiner—Paul R. Michl
Attorney, Agent, or Firm—Flynn, Thiel, Boutell & Tanis

[57] ABSTRACT

An aqueous ink is disclosed which comprises an emulsion of a polymeric dyestuff which is prepared by bonding a water-insoluble polymer containing amino groups with a dye selected from the group consisting of anion-type dyes and reactive dyes, which aqueous ink is free from globbing and skipping during writing and yields a high quality written image. When desired, a water-soluble viscosity-adjustment agent can also added to this aqueous ink. In this case, the viscosity of the aqueous ink can be adjusted to be in the range of 50 cps to 3000 cps and the ink is particularly suitable for use with a ball-point pen with a simple structure.

19 Claims, 4 Drawing Figures

AQUEOUS INK

BACKGROUND OF THE INVENTION

The present invention relates to an aqueous ink, and more particularly to an aqueous ink comprising a polymeric dyestuff which is formed by binding a polymer including amino groups with a particular dye, with the addition of a water-soluble viscosity-adjustment agent thereto when necessary.

In general, aqueous inks have a variety of advantages over oil-base inks. For instance, when an aqueous ink is used in writing instruments, it seldom spreads or penetrates into substrates (for example, paper) to the back side thereof, and is free from unpleasant odors and toxicity. More particularly, when an aqueous ink is employed in a ball-point pen, it is advantageous over oil-base inks in that it is free from globbing and skipping during writing, yielding a better quality written image than in the case of oil-base inks. Therefore, aqueous inks are used not only for such writing instruments, but also in a variety of writing and recording apparatuses, for example, as a jet ink in an ink-jet printing apparatus.

On the other hand, when oil-base inks are employed in writing instruments, they have certain advantages over aqueous inks in that the written ink images, once dried, are more resistant to water than aqueous ink images. In addition, written ink images of an oil-base ink containing a solvent with a low boiling point dry much more quickly than aqueous inks and are less subject to smearing by physical pressure than aqueous ink images.

Aqueous inks of the so-called solution type, in which a dye is dissolved in water, are generally used. When an aqueous ink of this type is employed for writing on a sheet of paper, and if the lines or images written by that ink happen to come into contact with water or something wet or damp, the lines or images immediately spread and become blurred due to the poor water-resistance thereof. This is a shortcoming of aqueous inks of the solution type.

Within this category of aqueous inks, there is an aqueous ink in which a basic dye is contained in order to yield clear written or printed images with high density. This type of aqueous ink, however, is not resistant to light (i.e., fades easily).

Further, since, with aqueous inks of the solution type, a dye is dissolved in water but the dye cannot be dissolved beyond a certain concentration, there is a limit to the written or printed image density that can be obtained by use of this aqueous ink, unless the amount of the ink applied to the sheet of paper per unit area of written or printed images is increased. However, if the amount of the ink applied to the paper per unit area of the written or printed images is increased, the written or printed images do not dry quickly, and it may occur that those written or printed images spread before drying.

In order to improve upon aqueous inks with respect to the above-described shortcomings, a variety of methods have been proposed. In one method, a pigment is mixed with an emulsion of a polymeric material when preparing the aqueous ink. In another method, a polymeric dyestuff, which is prepared by bonding a water-soluble dye with a water-soluble resin, is dissolved in water when preparing the aqueous ink.

The former method, however, has the shortcomings that it does not provide sufficient dispersion stability of the pigment for practical use, since the pigment employed has a comparatively great specific weight. When the pigment is used in this method, the use of the pigment alone does not provide a clear color; but, if a dye is added to the pigment in order to obtain a more clear color, the written or printed ink images become considerably vulnerable to water.

The latter method does not provide written or printed images with sufficient water-resistance for practical use.

When an aqueous ink of any of the above-described conventional types is employed in ball-point pens, it is necessary, due to the low viscosity of the aqueous ink, to employ a ball-point pen with a relatively complicated structure as shown in FIG. 1. Such a ball-point pen comprises an ink magazine member 2 for holding a porous material 1 therein, and a writing point 5 for holding a ball 4 and an ink-leading core member 3 disposed adjacent to the ball 4.

If conventional aqueous ink is placed in a ball-point pen intended for use with an oil-base ink, as shown in FIG. 2, comprising a writing point 5 for holding a ball 4, and an ink magazine 2, with a much simpler structure than that of the ball-point pen for use with an aqueous ink, and if the writing point 5 is directed downwards, the aqueous ink flows down from the writing point 5, due to the low viscosity thereof, by the pressure applied to the ink under its own weight within the ink magazine 2. In other words, the conventional aqueous ink cannot be employed in the ball-point pen having such a simple structure, in which the aqueous ink is directly placed in the ink magazine 2, as shown in FIG. 2.

SUMMARY OF THE INVENTION

It is therefore an object of the present invention to provide an improved aqueous ink from which the shortcomings of the conventional aqueous inks have been eliminated, but which has the advantages of both conventional aqueous inks and oil-base inks, that is, it neither spreads nor penetrates into substrates to the back side thereof, is free from unpleasant odors and toxicity and is water-resistant.

Another object of the present invention is to provide an improved aqueous ink for use with a ball-point pen, which is free from globbing and skipping during writing, yields a high quality written image without being susceptible to smearing by physical pressure, and can be employed, with the addition of a viscosity-adjustment agent thereto for appropriate adjustment of the viscosity of the ink, in a ball-point pen with a simple structure.

An aqueous ink according to the present invention comprises as the main component an emulsion of a polymeric dyestuff which is prepared by bonding a water-insoluble polymer having amino groups with an anion-type dye or with a reactive dye.

Another aqueous ink according to the present invention, which is particularly suitable for use in ball-point pens with a simple structure, further comprises a water-soluble viscosity-adjustment agent capable of adjusting the viscosity of the aqueous ink to a value in the range of 50 cps to 3,000 cps.

DETAILED DESCRIPTION OF THE PREFERRED EMBODIMENTS

Figure 1:
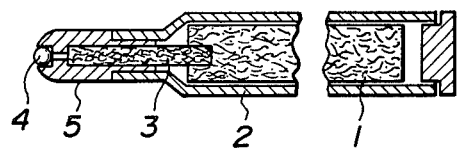
FIG. 1 is a schematic cross-sectional view of a conventional ball-point pen for use with an aqueous ink.

An aqueous ink according to the present invention comprises as the main component an emulsion of a polymeric dyestuff which is prepared by bonding a water-insoluble polymer including amino groups with an anion-type dye or with a reactive dye.

The water-insoluble polymer for use in preparing the polymeric dyestuff contains primary, secondary, tertiary, or quaternary amino groups or any combination thereof. In the present invention, amino groups are defined to be nitrogen containing groups which are considered to be derived from ammonia. A primary amino groups ($-NH_2$) is a group in which two hydrogen atoms are bonded to a nitrogen atom; a secondary amino group is a group in which only one hydrogen atom in the primary amino group is replaced by a substituent other than hydrogen; a tertiary amino group is a group in which the two hydrogen atoms in the primary amino group are replaced by two other substituents; and a quaternary amino group is a group in which four substituents other than hydrogen are bonded to the nitrogen atom. Specific examples of those amino groups are described in the examples of the water-insoluble polymers, and the monomers from which those polymers are prepared, given below. These amino groups can be bonded to the side chains of the polymers or can be contained in the main chains of the polymers, as in the case of polyurethane and polyamide, as shown by the examples given below. In the course of the preparation of the emulsion of the polymeric dyestuff, these amino groups are orientated on the surface of the polymer. The anion-type dye or the reactive dye, which forms the polymeric dyestuff in combination with the water-insoluble polymer, contains hydrophilic groups. The presence of the amino groups and hydrophilic groups in the polymeric dyestuff attains an extremely stable dispersion of the polymeric dyestuff in water.

Furthermore, the polymeric dyestuff is insoluble in water and forms a water-insoluble film over the written images on paper, so that the written images are resistant to water. Thus, by the use of the polymeric dyestuff in the aqueous ink according to the present invention, the excellent dispersion stability and the capability of producing water-resistant images are attained, which are the key features of the present invention.

If the above-mentioned dye is combined with a water-soluble polymer having amino groups, instead of a water-insoluble polymer, to prepare a polymeric dyestuff, and an aqueous ink containing the thus prepared polymeric dyestuff is prepared, that aqueous ink cannot be employed for practical use, since the prepared polymeric dyestuff is also water-soluble, the aqueous ink cannot provide water-resistant images, and the written or printed images do not dry quickly. Further, even if an emulsion of any other polymeric material is added to the above aqueous ink, that aqueous ink cannot be improved with respect to its water-resistance and quick-drying properties.

If an aqueous ink is prepared by adding a pigment to an emulsion of a polymer, the dispersion stability of the emulsion is poor.

If an aqueous ink is prepared by adding the above-mentioned water-soluble dye to an emulsion of a polymer having no functional groups, that aqueous ink does not provide water-resistant written images.

The polymeric dyestuff employed in the present invention is much better in light fading resistance and provides a better quality color than in the case where an anion-type dye or a reactive dye is dissolved in water, possibly because the polymeric dyestuff is formed in combination with the anion-type dye or with the reactive dye, either of which is better in light-resistance than conventionally employed basic dyes of the cationic type.

The aqueous ink according to the present invention is of an emulsion type containing the above-described polymeric dyestuff. In comparison with the particle size of a water-soluble dye or of a water-soluble polymeric dyestuff conventionally dissolved in water, the particle size of the polymeric dyestuff in the aqueous ink according to the present invention is larger. As a result, in the case of the present invention, the polymeric dyestuff particles remain in a high concentration on the surface of the sheet of paper, without significant penetration thereof through the fibers of the paper, whereby high image density of the written images and non-spreading of the written images are attained.

In the case of a conventional aqueous ink, it is not until the aqueous ink itself has been completely absorbed by the fibers of the paper that the written images are dry; therefore, a relatively long time is required before complete drying. In order to decrease the drying time, an additive for accelerating the absorption of the ink by the fibers of the paper can be added to the ink, although ink-spreading and penetration of the ink into the substrate to the back side thereof will take place.

In contrast to this, in the present invention, the particles of the polymeric dyestuff quickly adhere to each other before the water contained in the emulsion is completely absorbed by the fibers of the paper, so that a dry film is quickly formed over the written images.

In the present invention, moreover, for particular use with ball-point pens, a water-soluble viscosity-adjustment agent capable of adjusting the viscosity of the aqueous ink can be added.

Figure 2:
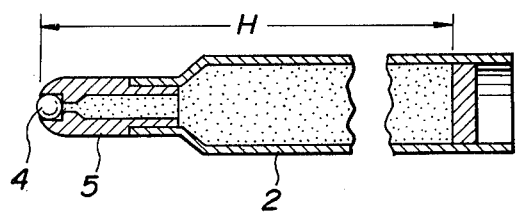
FIG. 2 is a schematic cross-sectional view of a conventional ball-point pen for use with an oil-base ink.

The inventor of the present invention has discovered that when the viscosity of the aqueous ink according to the present invention is adjusted to be in the range of 50 cps to 3,000 cps by addition of a water-soluble viscosity-adjustment agent thereto, even if the aqueous ink is placed in a ball-point pen with a simple structure, in which the aqueous ink is directly placed in the ink magazine as shown in FIG. 2, globbing and skipping during writing with the ink, and excessive flowing out of the ink from the writing point of the ball-point pen do not take place at all.

Figure 3:
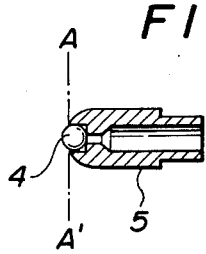
FIG. 3 is an enlarged cross-sectional view of the writing point of a ball-point pen.

More specifically, when the viscosity of the aqueous ink is prepared so as to have a viscosity within the above-mentioned appropriate range by addition of a water-soluble viscosity-adjustment agent thereto, water, which is one component of the aqueous ink in its dispersion phase, is evaporated at the small ring-shaped gap between the ball 4 and the writing point 5 for holding the ball 4 therein in the plane A-A' as shown in FIG. 3, so that the aqueous ink in the ring-shaped gap in the plane A-A' is concentrated to a higher viscosity, and then forms a dry polymeric film, whereby the flow of the aqueous ink out of the writing point 5 is stopped, against the pressure applied by the weight of the ink column. In other words, the aqueous ink in the ring-shaped gap between the ball 4 and the socket portion of the writing point 5 loses fluidity by the evaporation of water therefrom, forming a stopper capable of holding back the aqueous ink within the ink magazine against the pressure applied to the ink at that point by the weight of the ink column.

In the case of a conventional solution-type aqueous ink, it is necessary that the viscosity of the aqueous ink be 10,000 cps or more in order that the excess ink not flow out of the writing point. When the viscosity of the conventional aqueous ink is less than 10,000 cps, a ball-point pen with a particularly complex structure is necessary in order to prevent the excess ink from flowing out of the writing point.

It appears that, if the viscosity of the emulsion of the polymeric dyestuff for use in the present invention itself were adjusted to be in the range of 50 cps to 3,000 cps, without addition of any water-soluble viscosity-adjustment agent, the problem of the flowing of the aqueous ink out of the writing point could be eliminated. However, it is in fact better to use a water-soluble viscosity-adjustment agent than to prepare the emulsion of the polymeric dyestuff with a viscosity in the above-mentioned range, from the points of view of the stability of the aqueous ink and the case of preparation of the aqueous ink.

When a viscosity-adjustment agent is employed, it is preferable that the viscosity-adjustment agent be water-soluble in order to obtain the necessary stability of the prepared ink and to attain a smooth flow of the aqueous ink from the writing point.

Polymers for preparing the emulsions of the polymeric dyestuff for use in the present invention are as follows:
  (1) Polymers prepared by polymerizing each monomer in Category A in Table 1.
  (2) Copolymers prepared by copolymerizing the monomers in Category A in Table 1 with the monomers in Category C in Table 1.
  (3) Copolymers prepared by copolymerizing the monomers in Category B in Table 1 with the monomers in Category C in Table 1.

In addition to the above, polymers having amino groups, prepared by polyaddition or by polycondensation, for example, polyurethane and polyamides, can be employed.

To the emulsions of the above-mentioned polymers, there can be added polymer emulsions prepared by subjecting the monomers in Category C in Table 1 to emulsion polymerization.

Among the copolymers in the above-mentioned (2) and (3), copolymers prepared from diene-type monomers or from fluorine-containing vinyl monomers are capable of forming films with low adhesion and coagulation properties. As a result, an aqueous ink containing as the polymeric dyestuff a copolymer of the above-mentioned types provides images that can be erased by mechanical friction, for example, by rubbing with a rubber eraser.

Table 1

(A) Monomers having amino groups
  Dimethylaminoethylstyrene
  Diethylaminoethylstyrene
  Propylaminoethylstyrene
  Butylaminoethylstyrene
  Cyclohexyl aminoethylstyrene
  N,N'-diethylethylene diaminoethylstyrene
  Aminoethylmethyl aminoethylstyrene
  Diethylaminoethylmethacrylate
  N-vinylcarbazole
  N-vinylphthalimide
(B) Monomers having amino groups
  Acrylamide
  Methacrylamide
  N-methylolacrylamide
  Dimethylaminoethylmethacrylate
  Vinylpyridine
  N-vinyldimethylamine
  N-vinylimidazole
  N-vinylpyrrolidone
  Vinylpiperazine
  Aminostyrene
  Vinylsulfonamide
  Dimethylaminoethyl methacrylate.methylchloride
  Vinylphenethyl triethylammonium bromide
(C) Conventional vinyl monomers, diene-type monomers, and fluorine-containing vinyl monomers
  Conventional vinyl monomers:
    Styrene and styrene derivatives
    Vinyl acetate
    Acrylic esters
    Methacrylic acid esters
    Acrylonitrile
    Vinyl chloride
    Vinylidene chloride
  Diene-type monomers:
    Isoprene
    Butadiene
    Chloroprene
    Fluoroprene
    Phenylbutadiene
  Fluorine-containing vinyl monomers:
    Vinylidene fluoride
    Ethylene chloride trifluoride Methods of preparing emulsions of the polymers will now be specifically explained. As a matter of course, however, the emulsions of the polymers for use in the present invention are not limited to those prepared by the following methods:

(1) Preparation of emulsions of the polymers of the above-mentioned groups of polymers (1) and (2):

An emulsion of poly(2-isopropyl aminoethyl styrene) is prepared by subjecting 2-isopropylaminoethylstyrene to emulsion polymerization.

An emulsion of a copolymer of 2-isopropylaminoethylstyrene and styrene is prepared by subjecting 2-isopropylaminoethylstyrene and styrene to emulsion polymerization.

Likewise, an emulsion of a copolymer of 2-isopropylaminomethylstyrene and isoprene is prepared by subjecting 2-isopropylaminoethylstyrene and isoprene to emulsion polymerization.

In the emulsion polymerization, an emulsifying agent, a polymerization initiator and an electrolyte are employed in an aqueous solvent.

As the emulsifying agent, an anion-activating agent, such as sodium lauryl sulfate ester, and a non-ionic activating agent, such as polyoxyethylene nonylphenyl ether, can be employed.

As the polymerization initiator, an aqueous azo-type initiator, such as 2,2'-azobis(2-amidinopropane).hydrochloride, can be employed.

Further, as the electrolyte, for example, sodium triphosphate can be employed.

(2) Preparation of emulsions of the polymers of the above-mentioned group of polymers (3)

By subjecting methacrylamide and methyl methacrylate to emulsion polymerization, an emulsion of a copolymer of methacrylamide and methyl methacrylate, in which polymethacrylamide is partly dissolved, is obtained. In this case, since the polymethacrylamide, which is water-soluble, is adsorbed on the surfaces of the particles of the copolymer, which is water-insoluble, the polymethylacrylamide is not easily released from the copolymer. Therefore, when a polymeric dyestuff is prepared by use of the above emulsion, the state in which the water-soluble polymeric dyestuff is adsorbed on the surfaces of the particles of the water-insoluble dyestuff can be maintained. As a result, when an aqueous ink comprising an emulsion of the water-insoluble polymeric dyestuff and the water-soluble polymeric dyestuff is used for writing, a film in which the two polymeric dyestuff are mingled with each other is formed so as to cover the written images, whereby the written images are fortified against water.

It is preferable that the amount of the polymers having amino groups be in the range of 5 wt.% to 60 wt.% of the total weight of the aqueous ink.

As the polymers for use in the emulsion, polymers prepared by polymerizing different monomers in each of Category A, Category B, and Category C can also be employed.

For particular use with a ball-point pen, in addition to the above, poly(2-diethylaminoethylstyrene, poly(dimethylaminoethylmethacrylate.2-ethylhexylmethacrylate), poly(2-isopropylaminoethylstyrene.butadiene.2-ethylhexylmethacrylate), and styrene.butadiene rubber which is prepared by subjecting diethylaminoethylmethacrylate to graft-polymerization, can be employed in the present invention. These polymers can also be prepared by conventional emulsion polymerization.

Other than by the method of polymerization, by emulsion the above-described emulsions of polymers can be prepared by emulsifying a solution of polymers in an aqueous solvent by use of an emulsifying agent.

For particular use with a ball-point pen, it is desirable that the amount of the polymer having amino groups be in the range of 5 wt.% to 45 wt.%, more preferably in the range of 10 wt.% to 30 wt.%, of the total weight of an aqueous ink according to the present invention. When the amount of the polymer is less than 5 wt.%, the absolute amount of the dye that can be used is insufficient for obtaining images with high density and water-resistance. On the other hand, when the amount of the polymer is more than 45 wt.%, it is difficult to prepare a stable aqueous ink.

Examples of dyes that can be bonded with the polymers having amino groups are as follows;

Anion-type dyes, which dyes contain a sulfonic acid group, a carboxylic group, or a hydroxyl group, or are of the anion-complex type.

Acidic Dyes:
C.I. Acid Black 2, 26, 109, 110
C.I. Acid Blue 9, 22, 23, 40
C.I. Acid Red 18, 27, 87, 92, 94

Direct Dyes:
C.I. Direct Black 19, 154
C.I. Direct Blue 106, 158, 200
C.I. Direct Red 79, 83
C.I. Direct Violet 48

Mordant Dyes:
C.I. Mordant Black 7
C.I. Mordant Blue 13, 47, 48
C.I. Mordant Red 3, 7, 27

Metal Complex Dyes:
C.I. Acid Black 51, 52, 118, 119, 155, 158
C.I. Acid Blue 161
C.I. Acid Red 186, 265

Reactive Dyes

Dyes having as a reactive group, for example, a dichlorotriazinyl group, a monochlorotriazinyl group, a chloropyrimidyl group, a vinylsulfone group, an alkyl sulfuric group, or a bromoacrylic amide group.

For example:
C.I. Reactive Black 9, 10, 14
C.I. Reactive Blue 18, 19

These anion-type dyes and reactive dyes combine with the polymers having amino groups, for example, through van der Waals forces, hydrogen bonding, ionic bonding or covalent bonding. The bonding of such a dye with the polymer having amino groups is usually done by mixing the dye with an emulsion of the polymer or by mixing the two under application of heat thereto.

A mixture of any combinations of the anion-type dyes and the reactive dyes can also be used.

Further, it is preferable that the particle size of the polymeric dyestuff prepared in the emulsion be in the range of not more than 5 μm.

In addition to the emulsion of the polymeric dyestuff, to the aqueous ink according to the present invention, there can be added, when necessary, a moistening agent, a plasticizer, a solvent, an anti-germ agent, a pH adjustment agent or a viscosity-adjustment agent.

As the moistening agent, the following can be employed: glycerin; glycols, such as propylene glycol, diethylene glycol, polyethylene glycol; triethanolamine; sodium pyrrolidonecarboxylate; triethanolamine pyrrolidonecarboxylate; dimethyl sulfoxide; and 1,3-dimethyl-2-imidazolidinone.

As the plasticizer, the following can be used: esters, such as dibutyl phthalate, dioctyl phthalate, dioctyl adipate, dibutyl maleate, trimethylphosphate; known plasticizers, such as epoxidated soybean oil, expoxidated triglyceride, esters of chlorinated fatty acid; cellosolves, such as butyl cellosolve acetate, and carbitols, such as phenyl cabitol. As the solvent, aliphatic hydrocarbon solvents, aromatic hydrocarbon solvents, 1,3-dimethyl-2-imidazolidinone and N-methyl-2-pyrrolidone can be employed. When any of the plasticizers or polar solvents is added to the emulsion of the polymeric dyestuff, the particles of the polymer and the polymeric dyestuff can be softened or dissolved in the plasticizer or solvent, so that the adhesion properties of the polymeric dyestuff to the substrate can be controlled.

As the viscosity-adjustment agent, a variety of water-soluble resins, such as polyvinyl pyrrolidone, polyvinyl alcohol, cellulose ethers, and a copolymer of maleic acid and vinyl methylether, can be employed.

As the viscosity-adjustment agent for particular use in the aqueous ink for use with ball-point pens according to the present invention, a water-soluble viscosity-adjustment agent for adjusting the viscosity of the aqueous ink to be in the range of 50 cps to 3,000 cps is employed.

Examples of the water-soluble viscosity-adjustment agents are as follows: synthesized or natural water-soluble polymers, such as alkali salts of polyacrylic acid or of polymethacrylic acid; alkali salts of a copolymer containing acrylic acid or methacrylic acid; alkali salts of a copolymer of styrene and maleic acid; alkali salts of a copolymer of vinyl acetate and crotonic acid; polyvinyl alcohol (including a modified polyvinyl alcohol); alkali salts of a copolymer of methyl vinyl ether.maleic acid; derivatives of polyalkylene oxide; methyl cellulose; hydroxyethyl cellulose; sodium salt of carboxymethyl cellulose; gum arabic; and alkali salts of shellac. In addition to the above, polyethylene oxide, sodium aliginate, tragacanth gum, guar bean gum, karaya gum, additives for increasing the viscosity of emulsions, for example, SN-Thickener (water-soluble oligomer) made by Sannopco Limited, and Thickener QR-708 made by Rohm and Haas, can be employed as the viscosity-adjustment agent. Any of these viscosity-adjustment agents can be employed in an amount ranging from 0.01 wt.% to 15 wt.% of the total weight of the aqueous ink according to the present invention.

As the anti-germ agent, water-soluble or water-dispersible anti-germ agents, such as methyl p-hydroxybenzoate and 1,2-benzoisothiazolin-3-one can be used.

Furthermore, the following synthesized rubber latexes can be added:

Latexes of natural rubber, polyisoprene, polybutadiene, polychloroprene, poly(styrene.butadiene), poly(acrylonitrile butadiene), and poly(methyl.methacrylate butadiene), and poly(ethylene chloride trifluoride.-vinylidene fluoride). By addition of any of these latexes, the images written with the aqueous ink become erasable, by, for example, rubbing with a rubber eraser.

In addition to the above additives, a lubricating agent, a surface active agent and an anti-rusting agent can be added.

The lubricating agent is for attaining smooth working of the ball which is placed in a socket portion of the writing point of a ball-point pen.

As the lubricating agent, a variety of lubricants, such as polyalkylene glycol and alkali salts of fatty acids, extreme-pressure additives, a fluorine-containing-type surface active agent, or a phosphoric-ester-containing-type surface active agent, can be employed.

As the anti-rusting agent, a variety of commercially available anti-rusting agents, particularly those effective for iron- or copper-alloys, can be employed.

Furthermore, in order to adjust the tone of the color of the aqueous ink, a variety of pigments can be added.

In order to adjust the surface tension and to improve the stability of the aqueous ink, a variety of nonionic and anionic surface active agents can be employed.

The thus prepared aqueous ink according to the present invention is excellent in water-resistance, and light-resistance, and provides written images with high density, which dry very quickly and do not substantially spread on the substrate. Further, the aqueous ink can be placed in a ball-point pen with a simple structure, providing written images with high quality.

Because of the high quality of this aqueous ink, the ink can be employed not only for the writing instruments, but also for a variety of writing and recording apparatus, and can also be applied to substrates into which the ink does not penetrate, for example, to hard, dry painted materials, glass or enameled ware.

By referring to the following examples, embodiments of an aqueous ink according to the present invention will now be explained in detail.

EXAMPLE 1

The following components were placed in a pressure-resistant glass container and the atmosphere in the container was replaced with an inert gas:

|  | Parts by Weight |
| --- | --- |
| Water | 60 |
| Sodium lauryl sulfate | 0.58 |
| Polyoxyethylene nonyl phenol ether | 2.3 |
| 2,2'-azobis(2-amidinopropane)hydrochloride | 0.077 |
| 2-isopropylaminoethylstyrene | 3.5 |
| Styrene | 35 |
| Sodium triphosphate | 0.3 |

The above mixture was reacted for polymerization, with stirring, at 75° C. for 2 hours.

0.077 part by weight of 2,2'-azobis(2-amidinopropane) hydrochloride was further added to the reaction mixture and the polymerization reaction was continued for another 4 hours, whereby an emulsion of a copolymer of styrene and 2-isopropylaminoethylstyrene, with the solid components thereof being 33 wt.%, was prepared. In measurement of the amount of the solid components, the amount of the resinous components contained in the emulsion was measured.

An emulsion of a polymeric dyestuff was prepared by stirring the following components at 60° C. for 6 hours:

|  | Parts by Weight |
| --- | --- |
| The above-prepared emulsion of the copolymer of styrene/2-isopropylamino-ethylstyrene | 50 |
| C.I. Mordant Black 11 (Mitsui Chrome Black PB Conc made by Mitsui Toatsu Chemicals Inc.) | 2 |
| Water for moistening the dye (i.e., C.I. Mordant Black) | 2 |

To the thus prepared emulsion of the polymeric dyestuff, the following components were added and the mixture was then subjected to filtration, so that an embodiment No. 1 of an aqueous ink according to the present invention was prepared:

|  | Parts by Weight |
| --- | --- |
| Glycerin | 5 |
| Methyl p-hydroxybenzoate | 0.05 |

The thus prepared aqueous ink was placed in a ball-point pen of the type shown in FIG. 1, and a writing test was conducted on a sheet of ordinary office quality paper. The result was that the written images were high in image density and did not spread at all. Seven seconds after writing, the written images were touched with the finger. The written images did not spread and the written images were not smeared by the finger contact. Ten minutes later, when the written images-bearing paper was immersed in water for 30 minutes, the written images became only slightly blurred, and the image density of the written images was not changed at all.

The written images were subjected to a light-resistance test, and the test result was compared with the light-resistance of the images obtained by a conventional aqueous ink containing the same dye as that in the present embodiment, that is, C.I. Mordant Black 11. The result was that the present embodiment was better in light-resistance than the conventional aqueous ink.

EXAMPLE 2

Example 1 was repeated except that the emulsion of the polymeric dyestuff employed in Example 1 was replaced with an emulsion of a polymeric dyestuff prepared in accordance with the following formulation, so that an embodiment No. 2 of an aqueous ink according to the present invention was prepared:

|  | Parts by Weight |
| --- | --- |
| Emulsion of the copolymer of styrene and 2-isopropylaminoethylstyrene (prepared in Example 1) | 50 |
| C.I. Acid Black 26 (Kayanol Milling Black VLG made by Nippon Kayaku Co., Ltd.) | 4 |
| Water for moistening the dye (i.e., C.I. Acid Black 26) | 2 |
| Dibutyl maleate | 4 |

The thus prepared aqueous ink was placed in a ball-point pen of the type shown in FIG. 1 and was subjected to the same writing test and water-resistance test as in Example 1.

The result was that the written images were high in image density and did not spread at all. The written images dried as fast as in Example 1.

The water-resistance of the written images was greater than that of the written images in Example 1. Specifically, the written images did not become blurred at all after a 30-minute immersion in water, and the image density of the written images was not changed at all.

The written images were subjected to a light-resistance test, and the test result was compared with the light resistance of the images obtained by a conventional aqueous ink containing the same dye as that in the present embodiment, that is, C.I. Acid Black 26. The result was that the present embodiment was better in light-resistance than the conventional aqueous ink.

EXAMPLE 3

The following components were placed in a pressure-resisting glass container and the atmosphere in the container was replaced with an inert gas:

|  | Parts by Weight |
| --- | --- |
| Water | 30 |
| Sodium lauryl sulfate | 0.30 |
| Polyoxyethylene nonyl phenol ether | 1.2 |
| 2,2'-azobis(2-amidinopropane) hydrochloride | 0.040 |
| 2-diethylaminoethylstyrene | 20 |
| Sodium triphosphate | 0.13 |

The above mixture was reacted for polymerization, with stirring, at 75° C. for 2 hours.

0.040 part by weight of 2,2'-azobis(2-amidinopropane) hydrochloride was further added to the reaction mixture and the polymerization reaction was continued for another 4 hours, whereby an emulsion of poly(2-diethylaminoethylstyrene), with the solid components thereof being 32 wt.%, was prepared.

An emulsion of a polymeric dyestuff was prepared by stirring the following components at 60° C. for 6 hours:

|  | Parts by Weight |
| --- | --- |
| The above-prepared emulsion of poly(2-diethylaminoethylstyrene) | 10 |
| Reactive Dye (Lanasol Black B made by CIBA-GEIGY Ltd.) | 2 |
| Water | 40 |

To the thus prepared emulsion of the polymeric dyestuff, the following components were added, so that an embodiment No. 3 of an aqueous ink according to the present invention was prepared:

|  | Parts by Weight |
| --- | --- |
| Diethylene glycol | 5 |
| Anti-germ agent (Proxel XL-2 made by Imperial Chemical Industries, Ltd.) | 0.2 |

The thus prepared aqueous ink was placed in a marker with the writing point thereof made of a bundle of fibers. By use of this marker, the writing test and water-resistance test were conducted in the same manner as in Example 1. The results were almost the same as in Example 2.

EXAMPLE 4

An emulsion of a polymeric dyestuff was prepared by stirring the following components at 60° C. for 3 hours:

|  | Parts by Weight |
| --- | --- |
| Emulsion of polyurethane (with about 40% residue after evaporation) (Sanprene UX-3500 made by Sanyo Chemical Industries, Ltd.) | 50 |
| C.I. Acid Black 119 (Aizen Opal Black New Conc made by Hodogaya Chemical Co., Ltd.) | 5 |
| Water | 50 |

Prior to the preparation of the emulsion, the dye, C.I. Acid Black 119, was pre-wetted with water.

To the thus prepared emulsion of the polymeric dyestuff, the following components were added:

|  | Parts by Weight |
| --- | --- |
| Diethylene glycol | 5 |
| Anti-germ agent (Proxel XL-2) | 0.3 |

The mixture was then subjected to filtration as in Example 1, so that an embodiment No. 4 of an aqueous ink according to the present invention was prepared.

The thus prepared aqueous ink was placed in a ball-point pen of the type shown in FIG. 1 and was subjected to the same writing test and water-resistance test as in Example 1.

The results were the same as in Example 2.

EXAMPLE 5

An emulsion of a polymeric dyestuff was prepared by mixing the following components and then by allowing the mixture to stand for 1 day:

| | Parts by Weight |
|---|---|
| Emulsion of polyurethane (the same emulsion as that employed in Example 4) | 50 |
| C.I. Direct Black 19 (Daiwa Black 300H made by Daiwa Dyestuff MFG, Co., Ltd.) | 5 |
| Water | 50 |

Prior to the preparation of the emulsion, the dye, C.I. Direct Black 19, was pre-wetted with water.

To the thus prepared emulsion of the polymeric dyestuff, the following components were added:

| | Parts by Weight |
|---|---|
| Glycerin | 5 |
| Anti-germ agent (Proxel XL-2) | 0.3 |

The mixture was subjected to filtration as in Example 1, so that an embodiment No. 5 of an aqueous ink according to the present invention was prepared.

The thus prepared aqueous ink was placed in a ball-point pen of the type shown in FIG. 1 and was subjected to the same writing test and water-resistance test as in Example 1.

The results were the same as those in Example 1.

EXAMPLE 6

The following components were placed in a pressure-resistant glass container and the atmosphere in the container was replaced with an insert gas:

| | Parts by Weight |
|---|---|
| Water | 60 |
| Sodium lauryl sulfate | 0.55 |
| Polyoxyethylene nonyl phenol ether | 2.2 |
| 2,2'-azobis(2-amidinopropane)hydrochloride | 0.073 |
| Methacrylamide | 1.7 |
| Methyl methacrylate | 35 |
| Sodium triphosphate | 0.3 |

The above mixture was reacted for polymerization, with stirring, at 75° C. for 3 hours; whereby an emulsion of a copolymer of methacrylamide and methyl methacrylate, emulsified in an aqueous solution of polymethacrylamide, with the solid components thereof being 36 wt.%, was prepared.

An emulsion of polymeric dyestuff was then prepared by the following components at 60° C. for 6 hours:

| | Parts by Weight |
|---|---|
| The above-prepared emulsion | 50 |
| C.I. Mordant Black 11 (Mitsui Chrome Black PB Conc made by Mitsui Toatsu Chemicals Inc.) | 2 |
| Water | 50 |
| Polyoxyethylene nonyl phenol ether | 0.4 |
| Dibutyl maleate | 4 |

In the above preparation, the dye, C.I. Mordant Black 11, was first dissolved in water.

To the thus prepared emulsion of the polymeric dyestuff, the following components were added and the mixture was then subjected to filtration, so that an embodiment No. 6 of an aqueous ink according to the present invention was prepared.

| | Parts by Weight |
|---|---|
| Glycerin | 10 |
| Anti-germ agent (Proxel XL-2) | 0.3 |

The thus prepared aqueous ink was placed in a ball-point pen of the type shown in FIG. 1 and was subjected to the same writing test and water-resistance test as in Example 1.

The results were the same as in Example 1.

EXAMPLE 7

The following components were placed in a pressure-resistant glass container and the atmosphere in the container was replaced with an inert gas:

| | Parts by Weight |
|---|---|
| Water | 60 |
| Sodium lauryl sulfate | 0.57 |
| Polyoxyethylene nonyl phenol ether | 2.3 |
| 2,2'-azobis(2-amidinopropane)hydrochloride | 0.077 |
| 2-isopropylaminoethylstyrene | 5.1 |
| Sodium triphosphate | 0.27 |

37 parts by weight of isoprene were further added to the above mixture, and the mixture was reacted for polymerization, with stirring, at 75° C. for 2 hours.

0.077 part by weight of 2,2'-azobis(2-amidinopropane) hydrochloride was further added to the reaction mixture and the polymerization reaction was continued for another 4 hours. The unreacted isoprene was removed by evaporation. Thus, an emulsion of poly(isoprene 2-isopropylaminoethylstyrene), with the content of solid components thereof being 25 wt.%, was prepared.

An emulsion of a polymeric dyestuff was then prepared by stirring the following components at 60° C. for 6 hours:

| | Parts by Weight |
|---|---|
| The above-prepared emulsion of poly(isoprene 2-isopropylaminoethylstyrene) | 50 |
| Reactive Dye (Lanasol Black B) | 2 |
| Water | 5 |

In the above, the reactive dye, was pre-wetted with water.

To the thus prepared emulsion of the polymeric dyestuff, the following components, which were the same as employed in Example 1, were added and the mixture was then subjected to filtration, so that an embodiment No. 7 of an aqueous ink according to the present invention was prepared:

| | Parts by Weight |
|---|---|
| Glycerin | 5 |
| Methyl p-hydroxybenzoate | 0.05 |

The thus prepared aqueous ink was placed in a ball-point pen of the type shown in FIG. 1 and was subjected to the same writing test and water-resistance test as in Example 1.

The results were the same as in Example 2.

EXAMPLE 8

The following components were placed in a pressure-resistant glass container and the atmosphere in the container was replaced with an inert gas as in Example 7.

|  | Parts by Weight |
|---|---|
| Water | 60 |
| Sodium lauryl sulfate | 0.56 |
| Polyoxyethylene nonyl phenol ether | 2.2 |
| 2,2'-azobis(2-amidinopropane)hydrochloride | 0.074 |
| Acrylamide | 2.0 |
| Sodium triphosphate | 0.27 |

36 parts by weight of isoprene were further added to the above mixture, and the mixture was reacted for polymerization, with stirring, at 75° C. for 2 hours.

0.074 part by weight of 2,2'-azobis(2-amidinopropane) hydrochloride was further added to the reaction mixture and the polymerization reaction was continued for another 4 hours. The unreacted isoprene was removed by evaporation. Thus, an emulsion of a copolymer of isoprene and acrylamide, emulsified in an aqueous solution of polyacrylamide, with the solid components thereof being 30 wt.%, was prepared.

An emulsion of a polymeric dyestuff was then prepared by stirring the following components at 60° C. for 6 hours:

|  | Parts by Weight |
|---|---|
| The above-prepared emulsion of the copolymer of isoprene and acrylamide | 50 |
| C.I. Acid Black 26 (Kayanol Milling Black VLG) | 2 |
| Water | 2 |

In the above preparation, the dye, C.I. Acid Black 26, was pre-wetted by water.

To the thus prepared emulsion of the polymeric dyestuff, the following components, which were the same as those employed in Example 1, were added and the mixture was then subjected to filtration, so that an embodiment No. 8 of an aqueous ink according to the present invention was prepared:

|  | Parts by Weight |
|---|---|
| Glycerin | 5 |
| Methyl p-hydroxybenzoate | 0.05 |

The thus prepared aqueous ink was placed in a conventional marker and was subjected to the same writing test and water-resistance test as in Example 1.

The results were the same as in Example 1.

EXAMPLE 9

The following components were placed in a pressure-resistant stainless steel container and the atmosphere in the container was replaced with an inert gas:

|  | Parts by Weight |
|---|---|
| Water | 60 |
| Sodium lauryl sulfate | 0.5 |
| Polyoxyethylene nonyl phenol ether | 2.1 |
| 2,2'-azobis(2-amidinopropane)hydrochloride | 0.07 |
| 2-diethylaminoethylstyrene | 5.7 |
| Styrene | 8.0 |
| Sodium triphosphate | 0.27 |

27 parts by weight of butadiene were further added to the above mixture, and the mixture was reacted for polymerization, with stirring, at 55° C. for 24 hours.

The unreacted butadiene was removed by evaporation, so that an emulsion of a copolymer of butadiene, styrene and 2-diethylaminoethylstyrene, with the solid components thereof being 25 wt.%, was prepared.

An emulsion of a polymeric dyestuff was then prepared by stirring the following components at 60° C. for 6 hours:

|  | Parts by Weight |
|---|---|
| The above prepared emulsion of the copolymer of butadiene, styrene and 2-diethylaminoethylstyrene | 50 |
| C.I. Direct Black 17 (Kayaku Direct Fast Black D made by Nippon Kayaku Co., Ltd.) | 3 |
| Water | 4 |

In the above, the dye, C.I. Direct Black 17, was pre-wetted by water.

To the thus prepared emulsion of the polymeric dyestuff, the following components were added and the mixture was then subjected to filtration, so that an embodiment No. 9 of an aqueous ink according to the present invention was prepared:

|  | Parts by Weight |
|---|---|
| Diethylene glycol | 6 |
| Anti-germ agent (Proxel XL-2) | 0.3 |

The thus prepared aqueous ink was placed in a ball-point pen of the type shown in FIG. 1 and was subjected to the same writing test and water-resistance test as in Example 1.

The results were the same as in Example 2.

EXAMPLE 10

The following components were placed in a pressure-resistant stainless steel container and the atmosphere in the container was replaced with an inert gas as in Example 9:

|  | Parts by Weight |
|---|---|
| Water | 60 |
| Sodium lauryl sulfate | 0.5 |
| Polyoxyethylene nonyl phenol ether | 2.1 |
| 2,2'-azobis(2-amidinopropane)hydrochloride | 0.07 |
| Dimethylaminoethyl methacrylate | 4.5 |
| Sodium triphosphate | 0.27 |

27 parts by weight of butadiene were further added to the above mixture, and the mixture was reacted for polymerization, with stirring, at 55° C. for 24 hours.

The unreacted butadiene was removed by evaporation, so that an emulsion of a copolymer of dimethylaminoethyl methacrylate and butadiene emulsified in an aqueous solution of polydimethylaminoethyl methacrylate, with the solid components thereof being 21 wt.%, was prepared.

An emulsion of a polymeric dyestuff was then prepared by stirring the following components at 60° C. for 6 hours:

|  | Parts by Weight |
|---|---|
| The above-prepared emulsion of the copolymer of dimethylaminoethyl methacrylate and butadiene | 50 |
| C.I. Acid Black 118 (Opal Black BNH, metal complex dye, made by Hodogaya Chemical Co., Ltd.) | 5 |
| Water | 4 |

In the above, the dye, C.I. Direct Black 118, was pre-wetted by water.

To the thus prepared emulsion of the polymeric dyestuff, the following components were added and the mixture was then subjected to filtration, so that an embodiment No. 10 of an aqueous ink according to the present invention was prepared:

|  | Parts by Weight |
|---|---|
| Ethylene glycol | 6 |
| NBR latex (Nipol 1562 made by Nippon Zeon Co., Ltd.) | 20 |
| Anti-germ agent (Proxel XL-2) | 0.3 |

The thus prepared ink was placed in a ball-point pen of the type shown in FIG. 1 and was subjected to the same writing test and water-resistance test as in Example 1.

The results were the same as in Example 1.

EXAMPLE 11

An emulsion of a polymeric dyestuff was prepared by stirring the following components at 60° C. for 6 hours:

|  | Parts by Weight |
|---|---|
| Emulsion of poly(2-diethylaminoethylstyrene) with 32 wt. % of solid components, prepared in Example 3 | 10 |
| Reactive Dye (Lanasol Black B) | 2 |
| Water | 10 |

To the thus prepared emulsion of the polymeric dyestuff, the following components were added and the mixture was then subjected to filtration, so that an embodiment No. 11 of an aqueous ink according to the present invention was prepared.

|  | Parts by Weight |
|---|---|
| NBR latex (Nipol 1562) | 20 |
| Anti-germ agent (Proxel XL-2) | 0.2 |

The thus prepared aqueous ink was placed in a ball-point pen of the type shown in FIG. 1 and was subjected to the same writing test and water-resistance test as in Example 1.

The results were the same as in Example 2.

Comparative Example 1

A mixture of the following components was reacted for polymerization under a conventional procedure at 75° C. for 3 hours:

|  | Parts by Weight |
|---|---|
| Water | 50 |
| Acrylamide | 5 |
| 2,2'-azobis(2-amidinopropane) hydrochloride | 0.010 |

Thus, an aqueous solution of polyacrylamide was prepared.

An aqueous solution of a water-soluble polymeric dyestuff was then prepared by stirring the following components at 60° C. for 6 hours:

|  | Parts by Weight |
|---|---|
| The above-prepared aqueous solution of the water-soluble polyacrylamide | 25 |
| C.I. Acid Black 118 (Opal Black BNH) | 4 |
| Water | 75 |
| 10% aqueous solution of sodium hydroxide | 5 |

The aqueous solution of the water-soluble polymeric dyestuff was subjected to filtration, so that a comparative aqueous ink No. 1 was prepared.

The thus prepared comparative aqueous ink No. 1 was placed in a ball-point pen of the type shown in FIG. 1 and was subjected to the same writing test and water-resistance test as in Example 1.

The time required for drying the images written by this comparative ink was approximately twice as much as the times that were required for drying the images written by any of the foregoing aqueous inks according to the present invention. The water-resistance of the images written by the comparative ink was also extremely inferior to the water-resistance of the images written by any of the aqueous inks according to the examples of the present invention.

Comparative Example 2

A mixture of the following components was reacted for polymerization under the same conditions as in Comparative Example 1:

|  | Parts by Weight |
|---|---|
| Water | 60 |
| Methacrylamide | 10 |
| 2,2'-azobis(2-amidinopropane) hydrochloride | 0.020 |

Thus, an aqueous solution of polyacrylamide was prepared.

An aqueous solution of a water-soluble polymeric dyestuff was then prepared by stirring the following components at 60° C. for 6 hours:

|  | Parts by Weight |
|---|---|
| The above-prepared aqueous solution of the water-soluble polymethacrylamide | 15 |
| Reactive dye (Lanasol Black B) | 4 |
| Water | 100 |

-continued

| | Parts by Weight |
|---|---|
| Glycerin | 12 |

The aqueous solution of the water-soluble polymeric dyestuff was subjected to filtration, so that a comparative aqueous ink No. 2 was prepared.

The thus prepared comparative aqueous ink No. 2 was subjected to the same writing test and water-resistance test as in Example 1.

The time required for drying the images written by this comparative ink and the water-resistance of the written images were almost the same as those in Comparative Example No. 1.

Comparative Example 3

An aqueous solution of a water-soluble polymeric dyestuff was prepared by stirring the following components at 60° C. for 6 hours:

| | Parts by Weight |
|---|---|
| 30 wt. % aqueous solution of polyethyleneimine (Epomin P-1000 made by Nihon Shokubai Kagaku Kogyo Co., Ltd.) | 50 |
| C.I. Acid Black 26 (Kayanol Milling Black VLG) | 4 |
| Water | 30 |
| Diethylene glycol | 8 |

The aqueous solution of the water-soluble polymeric dyestuff was subjected to filtration, so that a comparative aqueous ink No. 3 was prepared.

The thus prepared comparative aqueous ink No. 3 was subjected to the same writing test and water-resistance test as in Example 1.

The time required for drying the images written by this comparative ink and the water-resistance of the written images were almost the same as those in Comparative Example No. 1.

The following are examples of emulsions of polymers for use in aqueous inks, which are particularly suitable for ball-point pens with simple structures, as will be explained later in Examples 12 through 19.

Emulsion No. 1

A mixture (A-1) was prepared by mixing the following components:

| | Parts by Weight |
|---|---|
| Water | 435 |
| Sodium lauryl sulfate | 4.7 |
| Polyoxyethylene nonyl phenol ether | 18.9 |
| Sodium triphosphate | 2.4 |
| 2,2'-azobis(2-amidinopropane) hydrochloride | 0.6 |

A mixture (B-1) was prepared by mixing the following components:

| | Parts by Weight |
|---|---|
| 2-ethylhexyl methacrylate | 270 |
| Dimethylaminoethyl methacrylate | 45 |

A mixture (C-1) was prepared by mixing the following components:

| | Parts by Weight |
|---|---|
| 2.2'-azobis(2-amidinopropane) hydrochloride | 0.6 |
| Water | 15 |

The entire mixture (A-1) and 90 parts by weight of the mixture (B-1) were placed in a container with a reflux condenser, and polymerization was initiated by heating the mixture at 65° C., with the atmosphere in the container continuously being replaced by $N_2$.

A mixture of the remainder of the mixture (B-1) and the mixture (C-1) was added dropwise to the reaction mixture and the polymerization reaction was continued at the same temperature (65° C.). Near the final stage of the polymerization, the temperature of the reaction mixture was elevated to 70° C., and the polymerization reaction was terminated. The time required for the polymerization was 5 hours.

Thus, an emulsion of a copolymer of 2-ethylhexyl methacrylate and dimethylaminoethyl methacrylate, Emulsion No. 1, was prepared. The amount of the solid components contained in the emulsion was 39 wt.%.

Emulsion No. 2

A mixture (A-2) was prepared by mixing the following components:

| | Parts by Weight |
|---|---|
| Water | 99 |
| Sodium lauryl sulfate | 1.08 |
| Polyoxyethylene nonyl phenol ether | 4.3 |
| Sodium triphosphate | 0.54 |
| 2,2'-azobis(2-amidinopropane) hydrochloride | 0.14 |

A mixture (B-2) was prepared by mixing the following components:

| | Parts by Weight |
|---|---|
| n-butylacrylate | 60 |
| Diethylaminoethyl methacrylate | 12 |

A mixture (C-2) was prepared by mixing the following components:

| | Parts by Weight |
|---|---|
| 2,2'-azobis(2-amidinopropane) hydrochloride | 0.28 |
| Water | 5 |

The entire mixture (A-2) and 18 parts by weight of the mixture (B-2) were placed in a container with a reflux condenser, and polymerization was initiated by heating the mixture at 60° C., with the atmosphere in the container continuously being replaced by $N_2$.

The remainder of the mixture (B-2) was added dropwise to the reaction mixture and the polymerization reaction was continued at the same temperature (60° C). Near the final stage of the polymerization, the temperature of the reaction mixture was elevated to 70° C., the mixture (C-2) was added dropwise to the reaction mixture, and the polymerization reaction was terminated.

The time required for the polymerization was 4 hours and 30 minutes.

Thus, an emulsion of a copolymer of n-butylacrylate and diethylaminoethyl methacrylate, Emulsion No. 2, was prepared. The amount of the solid components contained in the emulsion was 38 wt.%.

Emulsion No. 3

A mixture (A-3) was prepared by mixing the following components:

|  | Parts by Weight |
| --- | --- |
| Water | 300 |
| Sodium lauryl sulfate | 3.6 |
| Polyoxyethylene nonyl phenol ether | 14.4 |
| Sodium triphosphate | 3.0 |
| 2,2'-azobis(2-amidinopropane) hydrochloride | 0.5 |

A mixture (B-3) was prepared by mixing the following components:

|  | Parts by Weight |
| --- | --- |
| 2-ethylhexyl methacrylate | 200 |
| 2-isopropylaminoethylstyrene | 40 |

A mixture (C-3) was prepared by mixing the following components:

|  | Parts by Weight |
| --- | --- |
| 2,2'-azobis(2-amidinopropane) hydrochloride | 1 |
| Water | 30 |

The entire mixture (A-3) and the entire mixture (B-3) were placed in a container with a reflux condenser, and polymerization was initiated by heating the mixture at 75° C., with the atmosphere in the container continuously being replaced by $N_2$.

The mixture (C-3) was added dropwise to the reaction mixture and the polymerization reaction was continued at the same temperature (75° C.). The polymerization reaction was terminated in B 6 hours.

Thus, an emulsion of a copolymer of 2-ethylhexylmethacrylate and 2-isopropylaminoethylstyrene, Emulsion No. 3, was prepared. The amount of the solid components contained in the emulsion was 39 wt.%.

Emulsion No. 4

A mixture (A-4) was prepared by mixing the following components:

|  | Parts by Weight |
| --- | --- |
| Water | 300 |
| Sodium lauryl sulfate | 3 |
| Polyoxyethylene nonyl phenol ether | 12 |
| Sodium triphosphate | 1.3 |
| 2,2'-azobis(2-amidinopropane) hydrochloride | 0.4 | a component (B-4):

| 2-diethylaminoethylstyrene | 200 parts by weight |
| --- | --- |

A mixture (C-4) was prepared by mixing the following components:

|  | Parts by Weight |
| --- | --- |
| 2,2'-azobis(2-amidinopropane) hydrochloride | 0.4 |
| Water | 10 |

The entire mixture (A-4) and the entire component (B-4) were placed in a container with a reflux condenser, and polymerization was initiated by heating the mixture at 75° C., with the atmosphere in the container continuously being replaced by $N_2$.

The mixture (C-4) was added dropwise to the reaction mixture and the polymerization reaction was continued at the same temperature (75° C.). The polymerization reaction was terminate in 6 hours.

Thus, an emulsion of poly(2-diethylaminoethylstyrene), Emulsion No. 4, was prepared. The amount of the solid component contained in the emulsion was 32 wt.%.

Emulsion No. 5

A mixture (A-5) was prepared by mixing the following components:

|  | Parts by Weight |
| --- | --- |
| Water | 600 |
| Sodium lauryl sulfate | 5.7 |
| Polyoxyethylene nonyl phenol ether | 23 |
| Sodium triphosphate | 2.7 |
| 2,2'-azobis(2-amidinopropane) hydrochloride | 0.77 |

A component (B-5):

| 2-isopropylaminoethylstyrene | 51 parts by weight |
| --- | --- |

A component (C-5):

| Isoprene | 370 parts by weight |
| --- | --- |

A mixture (D-5) was prepared by mixing the following components:

|  | Parts by Weight |
| --- | --- |
| 2,2'-azobis(2-amidinopropane) hydrochloride | 0.77 |
| Water | 15 |

The entire mixture (A-5) and the entire component (B-5) were placed in a pressure-resistant container, with the atmosphere in the container replaced by $N_2$. The entire component (C-5) was then added to the mixture, and polymerization was initiated by heating the mixture at 75° C. The mixture (D-5) was added dropwise to the reaction mixture and the polymerization reaction was continued at the same temperature. The polymerization reaction was terminated in 6 hours.

Thus, an emulsion of a copolymer of isoprene and 2-isopropylaminoethylstyrene, Emulsion No. 5, was prepared. The amount of the solid components contained in the emulsion was 25 wt.%.

Emulsion No. 6

A mixture (A-6) was prepared by mixing the following components:

|  | Parts by Weight |
| --- | --- |
| Water | 60 |
| Sodium lauryl sulfate | 0.58 |
| Polyoxyethylene nonyl phenol ether | 2.3 |
| Sodium triphosphate | 0.3 |
| 2,2'-azobis(2-amidinopropane) hydrochloride | 0.077 |

A mixture (B-6) was prepared by mixing the following components:

|  | Parts by Weight |
| --- | --- |
| 2-isopropylaminoethylstyrene | 3.5 |
| Styrene | 35 |

A mixture (C-6) was prepared by mixing the following components:

|  | Parts by Weight |
| --- | --- |
| 2,2'-azobis(2-amidinopropane) hydrochloride | 0.077 |
| Water | 2 |

As in Emulsion No. 4, the entire mixture (A-6) and the entire mixture (B-6) were placed in a container with a reflux condenser, and the polymerization was initiated by heating the mixture at 75° C., with the atmosphere in the container continuously being replaced by $N_2$. The mixture (C-6) was added dropwise to the reaction mixture and the polymerization reaction was continued at the same temperature (75° C.). The polymerization reaction was terminated in 6 hours.

Thus, an emulsion of a copolymer of 2-isopropylaminoethylstyrene and styrene, Emulsion No. 6, was prepared. The amount of the solid components contained in the emulsion was 33 wt.%.

Referring to the following Examples No. 12 through No. 19, embodiments of an aqueous ink according to the present invention, which are particularly suitable for use with ball-point pens, will now be explained. In these examples, a dye, a moistening agent and an anti-germ agent were dissolved in water, and the mixture was added to one of Emulsions No. 1 through No. 6 and/or other emulsions. This mixture was stirred under application of heat thereto, and a water-soluble viscosity-adjustment agent was added to the mixture, whereby each aqueous ink was prepared.

When particles with a particle size of more than 5 μm were contained in the aqueous ink, such particles were filtered off.

In Example 19, dibutyl maleate was employed as a plasticizer, by emulsifying it in the Emulsion No. 6, with addition of polyoxyethylene nonyl phenol ether, which served as a surface active agent.

EXAMPLE 12

An embodiment No. 12 of an aqueous ink according to the present invention was prepared under the above-described procedure, with the following formulation:

|  | Parts by Weight |
| --- | --- |
| C.I. Direct Black 19 (Daiwa black 300H, made by Daiwa Dyestuff Mfg. Co., Ltd.) | 9 |
| Diethylene glycol | 16 |
| Anti-germ agent (Proxel XL-2) | 1 |
| Water | 18 |
| Emulsion No. 1 | 56 |
| Water-soluble viscosity-adjustment agent [Johncryl 142 (alkali-soluble 39% acryl polymer emulsion, made by Johnson & Son, Inc. 5 parts, and 10% aqueous solution of sodium hydroxide 2 parts] | 7 |

EXAMPLE 13

An embodiment No. 13 of an aqueous ink according to the present invention was prepared in the same manner as in Example 12, with the following formulation:

|  | Parts by Weight |
| --- | --- |
| C.I. Direct Black 19 | 9 |
| Diethylene glycol | 16 |
| Proxel XL-2 | 1 |
| Water | 18 |
| Emulsion No. 1 | 56 |
| Water-soluble viscosity-adjustment agent [Aron AS-7180 (18% aqueous solution of an acrylic copolymer made by Toagosei Chemical Industry Co., Ltd.)] | 11 |

EXAMPLE 14

An embodiment No. 14 of an aqueous ink according to the present invention was prepared in the same manner as in Example 12, with the following formulation:

|  | Parts by Weight |
| --- | --- |
| C.I. Acid Black 2 (Nigrosine NBC made by Sumitomo Chemical Co., Ltd.) | 5 |
| Diethylene glycol | 15 |
| Proxel XL-2 | 1 |
| Water | 19 |
| Emulsion No. 2 | 60 |
| Water-soluble viscosity-adjustment agent [Aron AS-7601 (30% aqueous solution of a polymer, made by Toagosei Chemical Industry Co., Ltd.)] | 7 |

EXAMPLE 15

An embodiment No. 15 of an aqueous ink according to the present invention was prepared in the same manner as in Example 12, with the following formulation:

|  | Parts by Weight |
| --- | --- |
| Lanasol Black 5095 (Reactive Dyestuff made by CIBA-GEIGY, Ltd.) | 6 |
| Glycerin | 15 |
| Proxel XL-2 | 1 |
| Water | 28 |
| Emulsion No. 4 | 50 |
| Water-soluble viscosity-adjustment agent (Sodium salt of carboxymethylcellulose) | 0.25 |

EXAMPLE 16

An embodiment No. 16 of an aqueous ink according to the present invention was prepared in the same manner as in Example 12, with the following formulation:

|  | Parts by Weight |
|---|---|
| C.I. Acid Black 2 | 5 |
| Glycerin | 20 |
| Proxel XL-2 | 1 |
| Water | 24 |
| Emulsion No. 3 | 50 |
| Water-soluble viscosity-adjustment agent (50% aqueous solution of ammonium salt of a copolymer of vinyl acetate and crotonic acid, MOWILITH CT 5A, made by Farbwerke Hoechst AG.) | 12 |

EXAMPLE 17

An embodiment No. 17 of an aqueous ink according to the present invention was prepared in the same manner as in Example 12, with the following formulation:

| | |
|---|---|
| C.I. Acid Black 119 (Aizen Opal Black New Conc made by Hodogaya Chemical Co., Ltd.) | 5 |
| Glycerin | 20 |
| Proxel XL-2 | 1 |
| Water | 24 |
| Emulsion of polyurethane (with about 40% solid residue after evaporation) (Sanprene UX-3500 made by Sanyo Chemical Industries, Ltd.) | 50 |
| Water-soluble viscosity-adjustment agent (Polyvinyl alcohol) | 0.8 |

EXAMPLE 18

An embodiment No. 18 of an aqueous ink according to the present invention was prepared in the same manner as in Example 12, with the following formulation:

|  | Parts by Weight |
|---|---|
| Lanasol Black 5095 | 4 |
| Glycerin | 20 |
| Proxel XL-2 | 1 |
| Water | 25 |
| Emulsion No. 5 | 50 |
| Styrene butadiene latex (with 40% of solid components) | 20 |
| Water-soluble viscosity-adjustment agent (Sodium salt of carboxymethyl cellulose) | 0.25 |

EXAMPLE 19

An embodiment No. 19 of an aqueous ink according to the present invention was prepared in the same manner as in Example 12, with the following formulation:

|  | Parts by Weight |
|---|---|
| C.I. Acid Black 26 (Kayanol Milling Black VLG made by Nihon Kayaku Co., Ltd.) | 4 |
| Glycerin | 15 |
| Proxel XL-2 | 1 |
| Water | 30 |
| Emulsion [(Emulsion No. 6 50 parts, plasticizer (Dibutyl maleate) 2 parts, and surface active agent (Polyoxyethylene nonyl phenol ether) 0.02 parts] | 50.2 |
| Water-soluble viscosity-adjustment agent (Sodium salt of carboxymethyl cellulose) | 0.3 |

Figure 4:
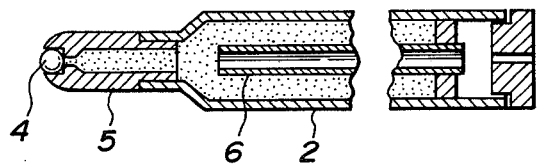
FIG. 4 is a schematic cross-sectional view of another ball-point pen.

The embodiments No. 12 through No. 19 of an aqueous ink according to the present invention were subjected to viscosity measurement and writing tests, with each aqueous ink placed in a Type 1 ball-point pen which was of the type shown in FIG. 2, or in a Type 2 ball-point pen which was of the type shown in FIG. 4.

In the viscosity measurement, the viscosity of each aqueous ink was measured by a B-type viscosimeter under the conditions of 20° C. and 60 rpm.

As previously explained, the Type 1 ball-point pen shown in FIG. 2 comprises an ink magazine 2 and a writing point 5 which holds a ball 4.

The Type 2 ball-point pen comprises an ink magazine 2 with an outer air guide pipe 6 therein, and a writing point 5 which holds a ball 4.

The writing tests included (1) an ink flow test, (2) a test for checking the water-resistance of the images written by each aqueous ink, and (3) a visual inspection for ink-spreading, ink-globbing, and skipping and writing.

In the ink flow test, each aqueous ink tested was placed in the Type 1 ball-point pen or in the Type 2 ball-point pen, and the ball-point pen was held vertically with the writing point directed downwards at 20° C. for 24 hours. After the 24 hours, whether or not the ink placed in the ball-point pen flowed out of the writing point was checked visually.

In the water-resistance test, predetermined lines and images were written on a sheet of office-quality paper by use of either the Type 1 ball-point pen or the Type 2 ball-point pen in which each aqueous ink was charged. 10 minutes later, after the writing, the paper was immersed in water and maintained in water for 30 minutes. Thereafter, the extent to which the written lines and images became blurred was visually checked.

In the visual inspection for ink-spreading, ink-globbing, and skipping in writing, predetermined lines and images were written on a sheet of office-quality paper by use of either the Type 1 ball-point pen or the Type 2 ball-point pen in which each aqueous ink was charged. During the writing, ink-globbing and skipping and writing were visually inspected. In addition, ink-spreading in writing was visually inspected by use of a loupe.

The results of these tests are summarized in the following table:

| Example | Viscosity (cps) | Ball-Point Pen | Excess Flow of Ink | Deterioration of Written Images by Water | Spreading of Images | Globbing and/or Skipping |
|---|---|---|---|---|---|---|
| 12 | ca. 300 | Type 1 | None | Almost None | Almost None | Almost None |
| 13 | ca. 1200 | Type 1 | None | Almost None | Almost None | Almost None |
| 14 | ca. 2700 | Type 1 | None | Almost None | Almost None | Almost None |
| 15 | ca. 150 | Type 1 | None | Almost None | Almost None | Almost None |
| 16 | ca. 1000 | Type 1 | None | Almost None | Almost None | Almost None |
| 17 | ca. 200 | Type 1 | None | Almost None | Almost None | Almost None |

-continued

| Example | Viscosity (cps) | Ball-Point Pen | Excess Flow of Ink | Deterioration of Written Images by Water | Spreading of Images | Globbing and/or Skipping |
|---|---|---|---|---|---|---|
| 18 | ca. 150 | Type 2 | None | Almost None | Almost None | Almost None |
| 19 | ca. 300 | Type 1 | None | Almost None | Almost None | Almost None |

What is claimed is:

1. An aqueous ink comprising an aqueous emulsion of a water-insoluble polymeric dyestuff, said water-insoluble polymeric dyestuff being prepared by bonding a water-insoluble polymer containing amino groups, which polymer is emulsified in an aqueous liquid, with a dye selected from the group consisting of anion-type dyes and reactive dyes.

2. An aqueous ink as claimed in claim 1, further comprising a water-soluble viscosity-adjustment agent.

3. An aqueous ink as claimed in claim 2, wherein said water-insoluble polymer is at least one polymer selected from the group consisting of (1) polymers prepared by polymerizing vinyl monomers having at least one amino group selected from the group consisting of a primary amino group, a secondary amino group and a tertiary amino group; (2) copolymers of (a) vinyl monomers having at least one amino group selected from the group consisting of a primary amino group, a secondary amino group, a tertiary amino group and a quaternary amino group, with (b) vinyl monomers, or (c) diene monomers, which vinyl monomers (b) or diene monomers (c) can be copolymerized with said vinyl monomers (a) and do not have amino groups; and (3) polymers containing amino groups, said last-mentioned polymers being prepared by polyaddition or polycondensation.

4. An aqueous ink as claimed in claim 2, wherein the amount of said water-soluble polymer is in the range of 5 wt.% to 45 wt.% of the total weight of said aqueous ink.

5. An aqueous ink as claimed in claim 2, wherein the particle size of said polymeric dyestuff is not more than 5 μm.

6. An aqueous ink as claimed in claim 2, wherein the amount of said water soluble viscosity adjustment agent is in the range of 0.01 wt.% to 15 wt.% of the total weight of said aqueous ink.

7. An aqueous ink as claimed in claim 2, wherein the viscosity of said aqueous ink is in the range of 50 cps to 3,000 cps at 20° C.

8. An aqueous ink consisting essentially of water-insoluble polymeric dyestuff particles dispersed in a balance of water, said dyestuff particles consisting essentially of an effective amount of a dye selected from the group consisting of anion-type dyes having hydrophilic groups and reactive dyes having hydrophilic groups, and the balance is a water-insoluble polymer containing amino groups that bond said dye with said polymer to form said dyestuff particles, said aqueous ink containing said water-insoluble polymer having amino groups in an amount in the range of from 5 to 60 wt.% of the total weight of said aqueous ink, said aqueous ink having been prepared by emulsion polymerizing a monomer component to form an aqueous dispersion of said polymer, then mixing said dye with said dispersion and bonding said dye to said polymer.

9. An aqueous ink as claimed in claim 8, wherein said anion-type dyes are selected from the group consisting of acidic dyes, direct dyes, mordant dyes, and metal complex dyes, and said reactive dyes have a reactive group selected from the group consisting of dichlorotriazinyl, monochlorotriazinyl, chloropyrimidyl, vinylsulfone, alkyl sulfuric, and bromoacrylic amide.

10. An aqueous ink as claimed in claim 1, wherein said water-insoluble polymer is at least one polymer selected from the group consisting of (1) polymers prepared by polymerizing vinyl monomers having at least one amino group selected from the group consisting of a primary amino group, a secondary amino group and a tertiary amino group; (2) copolymers of (a) vinyl monomers having at least one amino group selected from the group consisting of a primary amino group, a secondary amino group, a tertiary amino group and a quaternary amino group, with (b) vinyl monomers, or (c) diene monomers, which vinyl monomers (b) or diene monomers (c) can be copolymerized with said vinyl monomers (a) and do not have amino groups; and (3) polymers containing amino groups, said last-mentioned polymers being prepared by polyaddition or polycondensation.

11. An aqueous ink as claimed in claim 1, wherein the amount of said water-soluble polymer is in the range of 5 wt.% to 45 wt.% of the total weight of said aqueous ink.

12. An aqueous ink as claimed in claim 1, wherein the particle size of said polymeric dyestuff is not more than 5 μm.

13. An aqueous ink as claimed in claim 1, further comprising a lubricating agent.

14. An aqueous ink as claimed in claim 2, further comprising a lubricating agent.

15. An aqueous ink as claimed in claim 8 in which said aqueous ink has a viscosity in the range of from 50 to 3000 cps at 20° C.

16. An aqueous ink as claimed in claim 13 in which said lubricating agent is selected from the group consisting of polyalkylene glycols, alkali salts of fatty acids, extreme-pressure additives, fluorine-containing surface active agents and phosphoric ester surface active agents.

17. An aqueous ink as claimed in claim 14 in which said lubricating agent is selected from the group consisting of polyalkylene glycols, alkali salts of fatty acids, extreme-pressure additives, fluorine-containing surface active agents and phosphoric ester surface active agents.

18. An aqueous ink as claimed in claim 8 in which said water-insoluble polymer is a polymer of at least one monomer selected from the group consisting of
dimethylaminoethylstyrene,
diethylaminoethylstyrene,
propylaminoethylstyrene,
butylaminoethylstyrene,
cyclohexyl aminoethylstyrene,
N,N'-diethylethylene diaminoethylstyrene,
aminoethylmethyl aminoethylstyrene,
diethylaminoethylmethacrylate,
N-vinylcarbazole, and
N-vinylphthalimide.

19. An aqueous ink as claimed in claim 8 in which said water-insoluble polymer is a copolymer of (A) at least one monomer selected from the group consisting of
dimethylaminoethylstyrene,
diethylaminoethylstyrene,
propylaminoethylstyrene, butylaminoethylstyrene,
cyclohexyl aminoethylstyrene,
N,N'-diethylethylene diaminoethylstyrene,
aminoethylmethyl aminoethylstyrene,
diethylaminoethylmethacrylate,
N-vinylcarbazole,
N-vinylphthalimide,
acrylamide,
   methacrylamide,
N-methylolacrylamide,
dimethylaminoethylmethacrylate,
vinylpyridine,
N-vinyldimethylamine,
N-vinylimidazole,
N-vinylpyrrolidone,
vinylpiperazine,
aminostyrene,
vinylsulfonamide,
dimethylaminoethyl methacrylate.methylchloride, and
vinylphenethyl triethylammonium bromide,
with (B) at least one monomer selected from the group consisting of
styrene,
styrene derivatives free of amino groups,
vinyl acetate,
acrylic esters,
methacrylic acid esters,
acrylonitrile,
vinyl chloride,
vinylidene chloride,
isoprene,
butadiene,
chloroprene,
fluoroprene,
phenylbutadiene,
vinylidene fluoride, and
ethylene chloride trifluoride.

* * * * *

UNITED STATES PATENT AND TRADEMARK OFFICE
CERTIFICATE OF CORRECTION

PATENT NO. : 4 471 079
DATED : September 11, 1984
INVENTOR(S) : Shigekazu Enami

It is certified that error appears in the above—identified patent and that said Letters Patent is hereby corrected as shown below:

Column 27, line 38; change "water-soluble" to ---water-insoluble---.

Signed and Sealed this

Twenty-sixth Day of March 1985

[SEAL]

Attest:

DONALD J. QUIGG

Attesting Officer     Acting Commissioner of Patents and Trademarks